United States Patent
Couturier (10) Patent No.: US 7,583,604 B2
(45) Date of Patent: Sep. 1, 2009

(54) PROBE FOR MEASURING QUALITY-OF-SERVICE PARAMETERS IN A TELECOMMUNICATION NETWORK

(75) Inventor: Alban Couturier, Chatillon (FR)

(73) Assignee: Alcatel, Paris (FR)

( * ) Notice: Subject to any disclaimer, the term of this patent is extended or adjusted under 35 U.S.C. 154(b) by 783 days.

(21) Appl. No.: 10/762,301

(22) Filed: Jan. 23, 2004

(65) Prior Publication Data

US 2005/0022180 A1    Jan. 27, 2005

(30) Foreign Application Priority Data

Feb. 21, 2003    (FR)    ................................... 03 02136

(51) Int. Cl.
*H04M 11/00* (2006.01)
(52) U.S. Cl. .................... 370/241.1; 370/250; 370/252; 714/43; 714/724; 709/224
(58) Field of Classification Search ................. 370/253, 370/250, 241.1; 455/405
See application file for complete search history.

(56) References Cited

U.S. PATENT DOCUMENTS

| | | | |
|---|---|---|---|
| 6,009,274 A * | 12/1999 | Fletcher et al. | ............. 717/173 |
| 6,026,442 A | 2/2000 | Datta | ......................... 709/229 |
| 6,738,355 B1 * | 5/2004 | Love et al. | ................... 370/252 |
| 6,868,337 B2 * | 3/2005 | Muramatsu | .................. 701/211 |
| 6,904,020 B1 * | 6/2005 | Love et al. | ................... 370/252 |
| 2002/0019231 A1 * | 2/2002 | Palenius et al. | ............. 455/437 |
| 2002/0055999 A1 * | 5/2002 | Takeda | ....................... 709/224 |
| 2003/0093244 A1 * | 5/2003 | Corlett et al. | ............... 702/186 |
| 2007/0067113 A1 * | 3/2007 | Engel et al. | ................... 702/33 |

FOREIGN PATENT DOCUMENTS

EP    0 948 165 A    10/1999

* cited by examiner

*Primary Examiner*—Chi H. Pham
*Assistant Examiner*—Shick Hom
(74) *Attorney, Agent, or Firm*—Sughrue Mion, PLLC

(57) ABSTRACT

A measuring probe, able to access data flows composed of packets transmitted along a path formed by a plurality of equipment in a telecommunication network, having a measurement module to perform measurements in accordance with the configuration data, a determination module for determining that one or more transmitted packets form a signaling message, and a signaling module to determine configuration data from the signaling message.

27 Claims, 3 Drawing Sheets

PROBE FOR MEASURING QUALITY-OF-SERVICE PARAMETERS IN A TELECOMMUNICATION NETWORK

BACKGROUND OF THE INVENTION

1. Field of the Invention

This present invention relates to measuring the characteristic parameters of the equipment traversed by a data flow within a data network, and a telecommunication network in particular. It applies particularly well to measurement of quality-of-service parameters rendered in respect of the data flow passing through this telecommunication network, but could also apply to other characteristics of the equipment such as loading, temperature, the state of queues, and so on, located in the path of these data flows.

2. Description of the Related Art

In fact it is important to have measurements of certain parameters in order to verify the correct operation of one's network, and in particular to ascertain if the quality of service requested by customers is actually being provided.

In order to achieve this, there are various known devices in the current state of the art.

Figure 1:
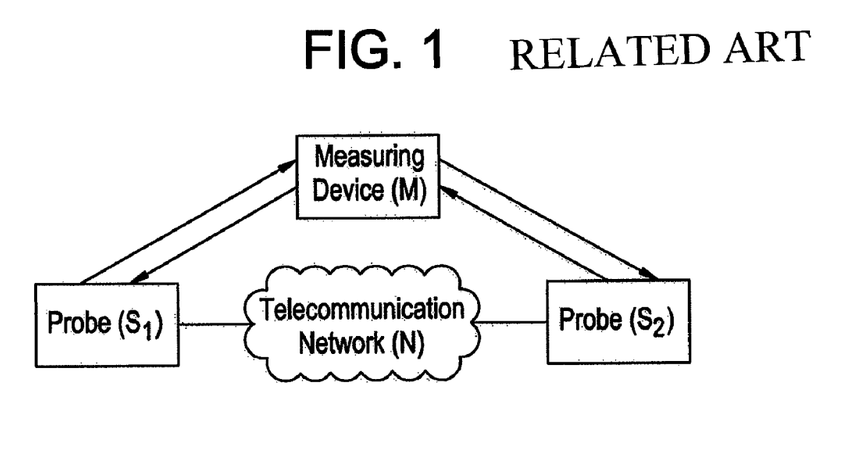
FIG. 1, already mentioned, illustrates a state-of-the-art solution.

For example, the Ipanema company markets measuring probes which can be placed at the input of the telecommunication network, as indicated in FIG. 1, in which probes S1 and S2 are connected to the telecommunication network (N). When data flows pass through probes S1 and S2, these measure some parameters and supply these parameters to a measuring device (M).

Measuring device (M) transmits information to the probes concerning the parameters they must measure. It can thus configure the data flows on which the measurements must be performed, as well as the periodicity of the measurements, etc.

However, such a device suffers from a major problem whenever the telecommunication network consists of several domains, each domain capable of being administered by a different telecommunication operator. The probes can be installed only at the extremities of the domain administered by the telecommunication operator. As soon as we find ourselves in a real environment, meaning one which is composed of several domains, it is no longer possible to obtain end-to-end measurements, since the operator of one domain will generally have access only to the equipment in its own domain, to the exclusion of all the other domains.

Moreover, it can be useful to have a measurement not just between the extremities of the network or of the domain, but also between the telecommunication terminals themselves, or even within the different domains or within the equipment traversed by a data flow.

This is particularly desirable in the case of telephony terminals on IP (Internet Protocol). In this situation, it does not seem clear how one can ascertain how to install and/or to configure the probes at the customer end, or within the networks traversed.

Thus, in order to do this, the entity wishing to perform the measurements must discover or configure the different measuring probes put in place in the different domains of the telecommunication network. The state-of-the-art solution is silent regarding this problem.

SUMMARY OF THE INVENTION

The aim of this present invention is to propose a solution for the measurement of parameters, in particular of quality-of-service parameters, which is easy to configure, and which does not suffer from the problems of the state-of-the-art solutions.

To this end, the subject of the invention is a measuring probe which has the means to access data flows composed of packets transmitted along a path formed by a plurality of equipment in a communication network, and the measurement means to perform measurements in accordance with configuration data. This probe is characterised in that it possesses, in addition:

the determination means which enable it to determine that one or more packets transmitted along this path form a signaling message and the signaling means which enable it to determine the configuration data from this signaling message.

Preferentially, these measurements relate to the said data flows.

In accordance with one method of implementation of the invention, the measurement means are capable of transmitting measurement reports, containing the measurements, to a measuring device which is determined by an identifier contained in the configuration data.

In accordance with one method of implementation of the invention, the measurements are transmitted to the measuring device by means of a proxy (or mediator), where the data transmitted to the proxy contains this identifier.

In accordance with one method of implementation of the invention, the means of determination are suitable for reading a specific label contained in the received message, and for determining whether this received message is a signaling message from this specific label.

In accordance with one method of implementation of the invention, the configuration base contains a set of records, each record corresponding to a measurement task and containing in particular:

a filter determining the packets on which the measurements are to be performed, parameters relating to the method of measurement In particular, the parameters can be chosen from a set consisting of:

the time during which the measurements must be performed, sampling data, which is a function of hashing in particular, a parameter triggering the time-stamping of the packets to be measured, a parameter triggering the identification of the packets to be measured, in particular by means of a hashing function.

a parameter triggering the counting of the packets, the method for transmitting the measurements to the measuring device.

In accordance with one method of implementation of the invention, the transmissions with the measuring device are made secure. In particular, these means of making secure can be transmitted by a signaling message.

In accordance with one method of implementation of the invention, the measuring probe consists in addition of the means to decide on the creation of a new measurement task, by the signaling means, in particular in accordance with a sensitivity indicator associated with this measuring probe.

In accordance with one method of implementation of the invention, the decision is also a function of a priority contained in the received message.

Another object of the invention is a network element, in particular a router which includes a measuring probe as described previously, as well as a communication network which includes such measuring probes, and possibly a measuring device.

Thus, by the use of an "in-path" signaling protocol to indicate to the measuring probes that they must establish measurement tasks, or that they must modify or delete these, the invention allows one not to have prior knowledge of the location of the measuring probes, and to surmount the problem of the measuring probes located in a domain administered by an operator other than that of the measuring device.

BRIEF DESCRIPTION OF THE DRAWINGS

The invention and its advantages will appear more clearly in the description of its implementation which follows, together with the appended figures.

DETAILED DESCRIPTION OF EXEMPLARY EMBODIMENTS

In accordance with various implementations of the invention, the measuring probe can be incorporated into a specific device such as those of the state-of-the-art devices of the Ipanema company, or indeed into network equipment such as a switch, an IP router, etc.

In this last case, the measuring probe can, in particular, be a software module capable of being executed by the operating system of the network equipment. This software module can be installed at the time of activation of the network equipment, or indeed later in the context of an update to the software of this equipment, and/or in a dynamic manner by downloading over the network, from a dedicated server for example. This software module can be developed in the Java™ language, for example, in order to facilitate its dynamic implementation on the network equipment.

By network equipment is meant a router in particular, in the context of a network based on an IPv4 or IPv6 protocol stack (Internet Protocol, version 4/6).

Following this, implementation of the invention for the measurement of quality-of-service parameters will be detailed in particular, although the invention can apply equally well to other parameters.

Figure 2:
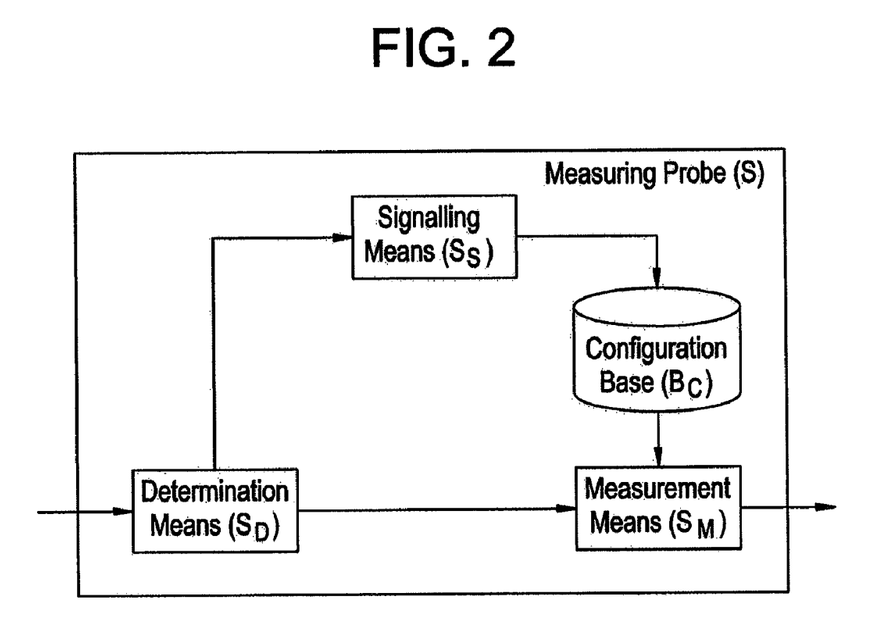
FIG. 2 represents the functional architecture of a probe according to the invention.

FIG. 2 illustrates the functional architecture of a measuring probe (S), according to the invention.

This measuring probe consists firstly of the means of determination (SD). The role of these means of determination is to determiner if one or more packets of incoming data form a signaling message or if they belong to a data flow. In the typical case of a data network based on a protocol stack of the IPv4 type (Internet Protocol version 4) or IPv6 type (Internet Protocol, version 6), the signaling messages can in fact be composed of several data packets.

The determination can be accomplished by means of a specific label. This specific label can be a dedicated port number, a dedicated DSCP (DiffServ Code Point), a protocol number of the IP header, etc.

If the received group of data packets forms a signaling message, it (or its content) is transmitted to signaling means (SS), the role of which is to interpret the content of this signaling message. According to the content of this message, the signaling means can then modify a configuration base (BC). The configuration base (BC) contains the configuration of the probe. It can consist of a set of records, with each record corresponding to a measurement task.

In general, all or part of the records of the configuration base (BC) determines which data flow should be measured by the corresponding measurement task, at which frequency the measurements should be performed, to which parameter they should apply, and so on (We will see later that in accordance with one method of implementation of the invention, certain of these records may not correspond to a measurement task).

In accordance with the terminology of the IETF, these records correspond to a state of the probe. These states can be of the same type as those specified for the RSVP protocol (ReSerVation Protocol), for example, specified by RFC 2205 of the IETF.

The content of the records will be detailed later, but it is important to note here that the signaling messages can trigger:

The establishment of a new measurement task. This establishment process gives rise to the insertion of a new record in the configuration base (BC), and therefore the creation of a new state within the measuring probe. This state can preferentially be of the "soft state" type, meaning that it will be deleted automatically at the end of a certain time period.

The refreshing of a state. In the method of implementation in which the states are of the type known as "soft states", refresh messages are used to prolong this period, by returning a counter to an initial value, for example. Of course, if the states are of the type known as "hard states", then no refresh message is necessary, since the state will remain installed for as long as a delete message concerning this state is not received.

The modification of a measurement task. This type of message can have as its purpose to modify a part of the parameters associated with a previously-established measurement task (for example, to change a sampling rate for the measurements in a dynamic manner, to adapt to the loading on the network, or indeed when close to a critical threshold). The corresponding record in the configuration base (BC) can be modified in order to take account of this modification.

The deletion of a measurement task. This deletion can give rise to deletion of the corresponding record in the configuration base (BC). In the situation where the states are of the "hard state" type, deletion messages are transmitted in order to terminate the measurement task and to delete the corresponding state.

In addition, in accordance with one method of implementation, the groups of normal packets are transmitted by the means of determination to the measurement means (SM). By normal packets is meant packets whose the content is not interpreted by the routers as are the content of the packets of the various network protocols like the signaling packets, the routing packets, the ICMP packets, etc. However, the invention can also apply to measurement of the flow of "non-normal" packets, such as OSPF (Open Shortest Path First) signaling flow, for example.

The role of these measurement means (SM) is to actually perform the measurement on the received packets, according to the configuration stored in the configuration base (BC). More precisely, the role of the measurement means is to process the various tasks which have been put in place in the measuring probe, where the configuration of each task has been specified by the content of the corresponding record in the configuration base (BC).

As mentioned previously, this configuration can determine several things for each of the measurement tasks.

To begin with, it can determine to what the measurements must apply, meaning the data flows to be measured, by means of a data-flow identifier list, for example.

To this end, filters can be put in place, in order, generally speaking, to select a sub-set of packets by the application of determinist functions to parts of the content of the packet, such as header fields or parts of the payload. A filter can also consist of applying a pseudo-probabilistic law to the selection of the sub-set. The concept of a filter can, for example, comply with that specified in the IETF draft entitled "draft-ietf-psam-sample-tech-00.txt".

In particular, these filters can be used to select the packets belonging to one or more of the data flows, on the basis of an identifier list.

Typically, in the case of an IP network, these identifiers can be a quintuple composed of the addresses and port numbers of the sender and the receiver of the flow, and of the protocol number. In the case of an IP network V6 (Internet Protocol version 6), the "Flow Label" field can be added to this quintuple.

The configuration can also specify how the measurements should be performed. More precisely, it can possibly indicate:
- the time during which the flow should be the subject of measurements.
- Alternatively, it is possible not to specify any time, and halting of the measurements must then be indicated by the emission of another signaling message or by the expiry of a timeout in the absence of a refresh message. In accordance with this method of implementation, there exists a soft-state mechanism which is similar to that implemented for the RSVP protocol (ReSerVation Protocol).
- whether these measurements are to apply to all of the packets or, on the contrary, whether sampling should be employed. In the event of sampling being applied, the configuration can also contain the frequency of the measurements (one packet in n; 1 packet every n milliseconds, etc.), a hashing function with a constraint on the result, and so on.
- a parameter triggering the time-stamping of the packet,
- a parameter triggering the identification of the packet using a hashing function.
- A parameter triggering the counting of the packets,
- the method for transmitting the measurements to the measuring device (M), in particular if these measurements are to be transmitted for each measurement performed, or indeed if they are to be grouped into a single message in order to limit communications. In this last case, the configuration can contain the frequency of transmission (one transmission for every n measurements, one transmission every n milliseconds, etc.), and so on.
- etc.

As will be seen later, the configuration can also indicate an identifier for the measuring device, and also the means of making secure.

The choice of the parameters contained in the signaling message can depend in particular on the type of measurement to be performed. Thus, the parameters can be different if one is measuring an average transmission time or indeed a packet loss rate.

In the case of an average transmission-time measurement, one method of implementation of the invention consists of executing the following stages:

1) sampling: it is important not to select all the packets of the sub-set concerned, in order not to encumber the network and collector M, but at the same time a minimum number is necessary. An additional difficulty is that the same packets must be selected by all of the measuring probes in order that a correlation may be possible by the collector(s) (M).

A deterministic sampling method is therefore put in place, using a hashing function for example. A hashing function can be a non-bijective mathematical application which is associated with an invariant content of packets (that is one which is not modified by the network elements), such as the payload of the packet, a value which is tested in order to determine if the packet should be part of the sample or not. Since this function is an application, and since it is based on an invariant, two probes will then end up with the same value, and therefore will reach the same decision.

In practice, this function can be chosen in accordance with the desired sampling probability, the speed of the data flow, and the entropy of the packet content.

2) Next, a date is associated with the selected packet. At this stage, it is desirable that all of the probes should have their clocks synchronised. To this end, state-of-the-art synchronisation techniques can be used, in particular making use of the GPS (Global Positioning System) or indeed of the NTP (Network Time Protocol), as specified in RFC 1305 of the IETF (Internet Engineering Task Force).

3) In a third stage, the selected packet is "identified". This means that a value is associated with it which is used to identify it in unique manner from the other packets in the same flow and from those in other data flows. Here again, identification can be achieved by means of a hashing function. The result of the hashing function, which forms the identifier of the packet, should be sufficiently long to prevent two different packets from having identical identifiers. The hashing function should be identical for all of the probes, in order that a given packet is associated with a given identifier and to ensure that the measuring device (M) (or collector) can make the correlation between the reports coming to it from the probes.

4) Finally, the fourth stage consists of transmitting a measurement report to the measuring devices or collector M.

Thus, for a given sampled packet, collector M receives several measurement reports from various probes. Using the unicity property of the identifiers, it can easily achieve correlation between its measurement reports, and by comparing the dates inserted in these by the probes, it can determine the timing of the sampled packet between each probe.

In this example, the signaling message therefore consists of the following elements: a filter, a hashing function for the sampling, a parameter triggering the time-stamping of the packets, and a hashing function for the identification process.

In the case of packet loss rate measurement, the principle is essentially the same as that of the previous example. In accordance with one method of implementation, the difference resides in the fact that, in place of the date of receipt of the packet, the measurement report contains the sequential number of the packet, given by a counter contained in the probe.

In this example, the signaling message therefore consists of the following elements: a filter, a hashing function for the sampling, and a parameter triggering the counting of the packets.

As mentioned previously, the measurements performed by the measurement means (SM) can then be transmitted to a measuring device, not shown in FIG. 2, the purpose of which can be to consolidate the measurements received from several measuring probes. These measuring devices may also be called "collectors".

An identifier for this measuring devices can, for example, be indicated in configuration base BC. In particular, the nature of this measuring device can vary in accordance with the data flow measurements. This identifier can be supplied by the signaling messages and can be inserted into the configuration base by the signaling means (SS), like all other configuration data.

This identifier can be an IP (Internet Protocol) address, or indeed a protocol number or a more abstract address such as a URL (Unified Resource Locator) as described by RFC 2396.

Figure 3:
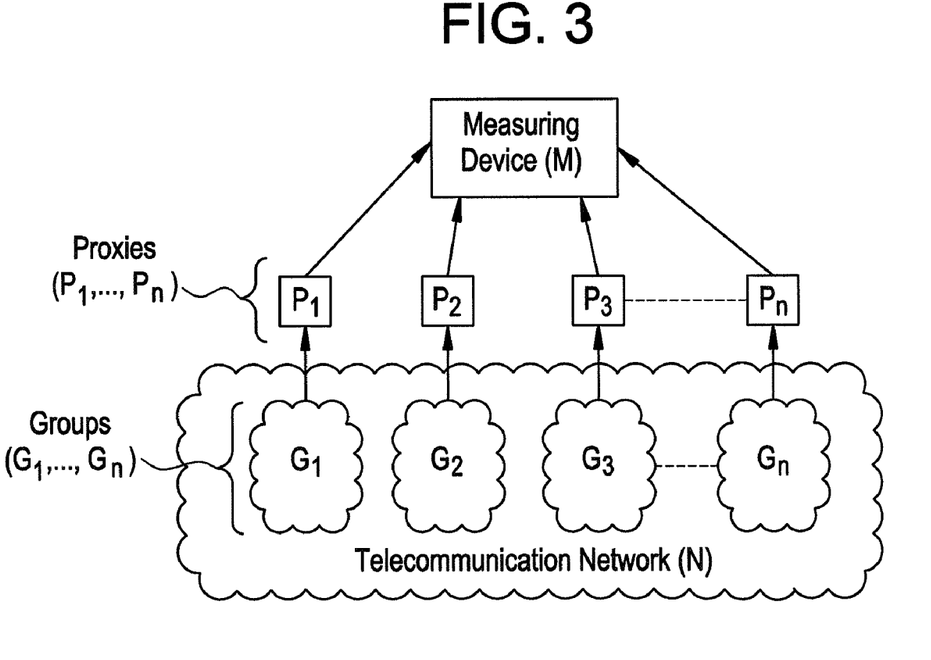
FIG. 3 is a schematic representation of communications between the probes according to the invention and a measuring device.

In addition, the measurements can be sent to the measuring device by means of proxies or mediators, as shown in FIG. 3. Telecommunication network N is composed of a system of network equipment divided into a number of groups. With each group, G1, G2, G3, . . . Gn, a proxy, respectively P1, P2, P3, . . . Pn, is associated. The measurements taken by the measuring probes of the network equipment are transmitted to the proxy associated with the corresponding group. This proxy can then transmit the measurements to the measuring device (M). In accordance with one method of implementation of the invention, an identifier (the address, for example) of the measuring device (M) is inserted into the measurement reports transmitted to the proxies, so that these are then able to transmit the measurement reports to the appropriate measuring device.

Where appropriate, the proxies can perform pre-processing prior to transmission to the measuring device (M). This pre-processing can, for example, simply consist of aggregating the measurements received from the probes, in order to send reports of a more summary nature to the measuring device (M) and to limit the traffic.

This method of implementation is advantageous in the case of large telecommunication networks, since it allows a better division of communications between network elements and measuring devices, as well as limiting inter-operator communications in the case of measurements on different networks.

In accordance with one method of implementation of the invention, the measurements can be transmitted to the measuring devices in a secure form, encoded by a public key for example.

One of the advantages of the invention is that it is easy to establish and determine a large number of measuring probes. These measuring probes can include redundancy, meaning that there can be more of them than necessary. For example, to measure the quality-of-service parameters between 2 points, A and B, two probes would be necessary, but one can choose to establish 2 of them in the vicinity of point A and 2 in the vicinity of point B. The advantage of such redundancy is that it minimises the risks of measurement errors or of a defective measuring probe.

Another advantage of the invention that it can easily find and configure measuring probes. The state-of-the-art, 2-probe architectures require one to determine which are the probes which can be used, and to access these. In a multi-domain situation, a measurement can be requested by one operator on a probe of another operator, only with difficulty. In addition to solving these problems, the invention allows several measurements to be performed on the path of a flow, in order to locate a malfunction more easily (congestion, a quality-of-service problem, etc.).

Another advantage of the invention is that the measurements are performed by the measuring probes even if they are unaware of the presence of other probes, and consequently of measurements performed by other measuring probes. Also, any intentionally erroneous measurement supplied by a measuring probe can easily be detected by comparison with measurements supplied by nearby measuring probes.

In accordance with one method of implementation of the invention, the signaling means (SS) of the measuring probe also have the means to decide whether or not to create a new measurement task.

It can be decided to insert into the configuration base (BC) only those records associated with created measurement tasks, or indeed the records associated with any signaling message requiring the creation of a measurement task, whether it is accepted or not by the signaling means (SS). This second implementation is particularly useful when states of the "soft-state" type have been chosen. In this implementation, refresh messages can be received regularly. The fact of keeping a trace of the "refused" signaling messages allows cohesion to be maintained in the decisions made.

In order to make these decisions, the measuring probe is associated with a sensitivity indicator.

This sensitivity identifier can, for example, represent a probability that the signaling probe will decide to handle the signaling message. For example, when it receives a signaling message, the measuring probe can trigger the drawing of a random number. By comparison with the sensitivity indicator, it easily determines whether the signaling message should be handled or not.

In accordance with one implementation, this mechanism applies only to signaling messages containing information relating to the addition of a measurement tasks. On the other hand, signaling messages which modify a measurement task or delete a previously existing measurement task, can still be handled, meaning that it can involve a modification of the configuration base (BC) by the signaling means (SS).

In accordance with one implementation of the invention, the signaling messages can contain a priority. The decision to handle the signaling message or not can be weighted by the value of this priority.

For example, "routine" measurement jobs (for surveillance, for example) can be assigned a low priority. If an error has been observed at a given moment, a control system will be able to decide to transmit a signaling message with a higher priority in order to trigger measurements by a greater number of measuring probes, thereby allowing more accurate location of the problem.

In accordance with one particular method of implementation of the invention, the signaling messages can be stored in another database, not shown in the figure, even if the signaling means decide not to accept the creation of a new measurement task and do not modify the configuration base (BC).

Figure 4:
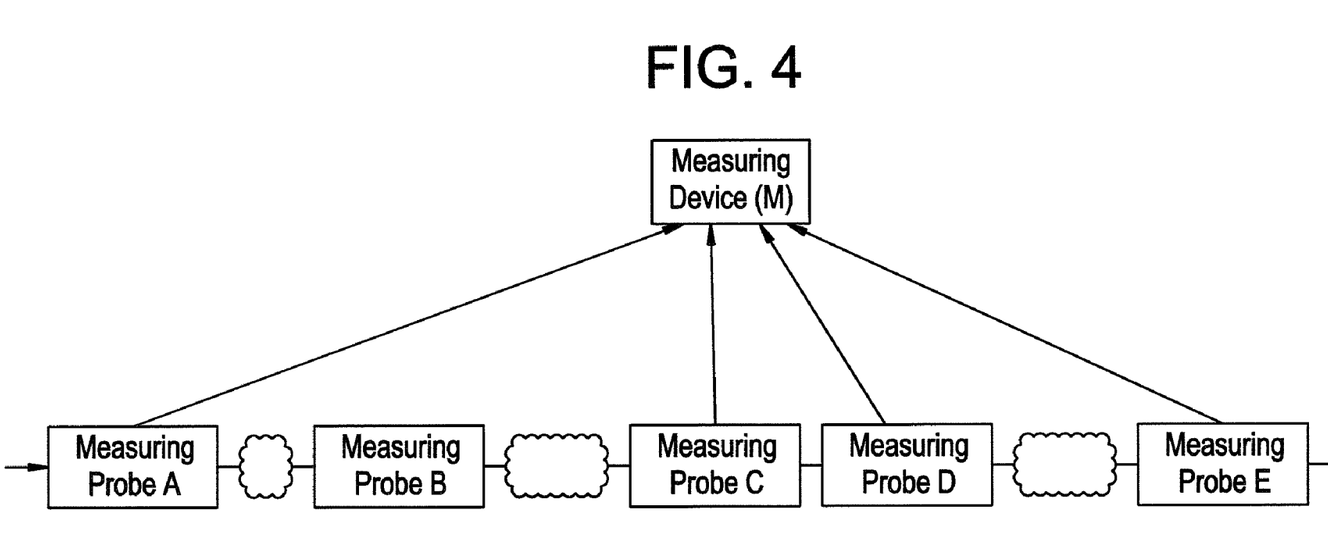
FIG. 4 illustrates the probe of the invention in an implementation context.

FIG. 4 illustrates one implementation of the invention.

A communication network consists of 5 measuring probes A, B, C, D and E. A signaling message is transmitted to A and then successively to B, C, D and E. This signaling message contains measurement data relating to the installation of a measurement task. The measuring probes have different sensitivity indicators. Probes A, C, D and E decide to insert these measurement data into their respective configuration bases. Measuring probe B decides to ignore the signaling message and does not modify its configuration base.

When messages belonging to the data flow correspond to these measurement data, then probes A, C, D and E take measurements in accordance with these measurement data, as indicated previously. These measurements are transmitted to a measuring device (M).

To the extent that measuring probes C and D are juxtaposed, if the measurements transmitted by these two probes differ by more than an acceptable error margin, then the measuring device (M) will be able to determine that at least one of the measuring probes is deficient.

If the measurements coming from measuring probes A and C differ by more than a certain level, then the measuring device will be able to determine that there is an anomaly between these two probes.

In order to specify the location of the anomaly, measuring device (M) can cause the emission of a new signaling message to measuring probe A, with a higher priority. This time, measuring probe B decides to establish a measurement task, and to insert the measurement data into its configuration base. On receipt of a message from the data flow, measuring probe B will also transmit measurements to the measuring device (M).

By comparing the measurements received from probes A and B, and those received from probes B and C, the measuring device can determine whether the anomaly is located between A and B or between B and C (or if it is divided between A and C).

A further advantage of the invention is that measuring probes A, C, D and E transmit their measurements independently of each other. Likewise, none of the measuring probes can be informed of the content of the measurements of the other probes, and even of the existence of these measurements or of the measuring probes themselves.

This results in a very high level of security and reliability of the invention.

In the event that the network is multi-domain in nature, meaning that it is controlled by several operators, these operators can therefore be assured that the measurement data cannot become known to the measuring probes belonging to a domain controlled by another operator.

In accordance with one method of implementation of the invention, the signaling messages comply with the following syntax, specified in Backus-Naur form (BNF):

```
<RequestMeasureMessage> =
<MeasureID>
<acceptance_factor>
<FLOW_FILTER>
<METERING_ACTIONS>
<COLLECTOR>
<METERING_ACTIONS>=1*<METERING_ACTION>
<EXPORTING>
<METERING_ACTION>=<COUNTER>/<SAMPLING>/
<IDENTIFICATION>
<COLLECTOR> =
<Collector_address>
[<report_frequency>]
[<security_data>]
```

This syntax indicates that, for the creation of a measurement task, a signaling message in accordance with the invention includes:

an identifier for the measurement task, an "acceptance factor" priority which, in collaboration with the sensitivity indicator, allows you to decide on the creation or not of the measurement task, a "FLOW_FILTER" used to select a sub-set of packets, on which the measurements are to be performed, "METERING_ACTIONS", which are used to specify which type of processing should be effected by the measurement means (SM), and in particular whether it involves counting, sampling, identification, etc.

the identification of a collector (M), in particular its address and optionally its frequency and security parameters.

The invention claimed is:

1. A measuring probe, comprising:
   means for accessing data flows composed of packets, transmitted along a path formed by a multiplicity of equipment in a telecommunication network;
   measurement means for performing measurements, in accordance with configuration data;
   determination means for determining that one or more packets transmitted along the said path form a signaling message; and
   signaling means for determining said configuration data from said signaling message
   wherein said measurement means are operable to transmit measurement reports, containing said measurements, to a measuring device determined by an identifier contained in said configuration data; and
   said measurements are transmitted to said measuring device by means of a proxy, the measurement reports transmitted to said proxy containing said identifier.

2. The measuring probe in accordance with claim 1, wherein said measurements are relative to said data flow.

3. The measuring probe in accordance with claim 1, wherein said determination means are operable to read a specific label, contained in said received message, and determine whether the said received message is a signaling message from this specific label.

4. The measuring probe in accordance with claim 1, wherein said configuration base contains a set of records, each record corresponding to a measurement task and each record comprising:
   a filter which determines the packets on which the measurements must be performed; and
   parameters relating to the method of measurement.

5. The measuring probe in accordance with claim 4, in which said parameters are chosen from the group of factors comprising:
   the time during which the measurements must be performed;
   sampling data
   a hashing function;
   a parameter triggering a time-stamping of the packets to be measured;
   a parameter triggering an identification of the packets to be measured, by means of a hashing function;
   a parameter triggering a counting of the packets to be measured;
   a method for transmitting the measurements to the measuring device (M).

6. The measuring probe in accordance with claim 1, wherein the transmissions with the measuring device are made secure.

7. The measuring probe in accordance with claim 6, wherein means for making the transmissions with the measuring device secure are transmitted by a signaling message.

8. The measuring probe in accordance with claim 1, further comprising:
   means for deciding whether said signaling means creates a new measurement task, in accordance with a sensitivity indicator associated with said measuring probe.

9. The measuring probe in accordance with claim 8, wherein said means for deciding also decides as a function of a priority contained in the said received message.

10. A router comprising the measuring probe in accordance with claim 1.

11. The telecommunication network comprising measuring probes in accordance with claim 1.

12. The telecommunication network in accordance with claim 11, further comprising measuring devices.

13. A method for taking measurements of data flows composed of packets, transmitted along a path formed by a multiplicity of equipment in a telecommunication network, the method comprising:
- performing measurements, in accordance with configuration data;
- determining that one or more packets transmitted along the said path form a signaling message;
- determining said configuration data from said signaling message;
- transmitting measurement reports, containing said measurements, to a measuring device determined by an identifier contained in said configuration data; and
- transmitting said measurements to said measuring device by means of a proxy, the measurement reports transmitted to said proxy containing said identifier.

14. The method of claim 13, wherein said measurements are relative to said data flow.

15. The method of claim 13, wherein said determining comprises reading a specific label, contained in said received message, and determining whether said received message is a signaling message from this specific label.

16. The method of claim 13, wherein said configuration base contains a set of records, each record corresponding to a measurement task and each record comprising:
- a filter which determines the packets on which the measurements must be performed; and
- parameters relating to the method of measurement.

17. The method of claim 16, in which said parameters are chosen from the group of factors comprising:
- the time during which the measurements must be performed;
- sampling data
- a hashing function;
- a parameter triggering a time-stamping of the packets to be measured;
- a parameter triggering an identification of the packets to be measured, by means of a hashing function;
- a parameter triggering a counting of the packets to be measured;
- a method for transmitting the measurements to the measuring device (M).

18. The method of claim 13, wherein the transmissions with the measuring device are made secure.

19. The method of claim 18, wherein means for making the transmissions with the measuring device secure are transmitted by a signaling message.

20. The method of claim 13, further comprising:
- deciding whether a new measurement task is created, in accordance with a sensitivity indicator associated with said measuring probe.

21. The method of claim 20, wherein said deciding is decided as a function of a priority contained in said received message.

22. A router comprising a measuring probe implementing the method of claim 13.

23. A measuring probe, comprising:
- means for accessing data flows composed of packets, transmitted along a path formed by a multiplicity of equipment in a telecommunication network, said data flows passing through said measuring probe;
- measurement means for performing measurements, in accordance with configuration data;
- determination means for determining that one or more packets transmitted along the said path form a signaling message; and
- signaling means for determining said configuration data from said signaling message;
- wherein said determining comprises reading a specific label, contained in said one or more packets, and determining whether said one or more packets are a signaling message from this specific label.

24. The measuring probe of claim 23, wherein said signaling message triggers an establishment of a new measurement task.

25. The measuring probe of claim 23, wherein said signaling message triggers a modification of a measurement task.

26. The measuring probe of claim 23, wherein said signaling message triggers a deletion of a measurement task.

27. The measuring probe of claim 23, wherein said signaling message comprises two or more packets.

* * * * *

UNITED STATES PATENT AND TRADEMARK OFFICE
CERTIFICATE OF CORRECTION

| | |
|---|---|
| PATENT NO. | : 7,583,604 B2 |
| APPLICATION NO. | : 10/762301 |
| DATED | : September 1, 2009 |
| INVENTOR(S) | : Alban Couturier |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1089 days.

Signed and Sealed this

Fourteenth Day of September, 2010

David J. Kappos
*Director of the United States Patent and Trademark Office*